United States Patent
Vodinh

(10) Patent No.: US 6,904,743 B2
(45) Date of Patent: Jun. 14, 2005

(54) LEAF RAKE COMBO KIT

(76) Inventor: Hein Vodinh, 644 Gulfwood Rd., Knoxville, TN (US) 37923

( * ) Notice: Subject to any disclaimer, the term of this patent is extended or adjusted under 35 U.S.C. 154(b) by 0 days.

(21) Appl. No.: 10/706,718

(22) Filed: Nov. 11, 2003

(65) Prior Publication Data

US 2005/0028510 A1 Feb. 10, 2005

Related U.S. Application Data

(60) Provisional application No. 60/493,261, filed on Aug. 7, 2003.

(51) Int. Cl.$^7$ .............................................. A01D 7/00
(52) U.S. Cl. ................................... 56/400.04; 294/50.5
(58) Field of Search ........................ 56/400.04, 400.07, 56/400.11, 400.12, 400.16, DIG. 18; 403/348–351; 294/50.5, 50.8, 50.9, 53.5; 172/370–374; 7/128, 160, 900

(56) References Cited

U.S. PATENT DOCUMENTS

| | | | |
|---|---|---|---|
| 1,588,927 A * | 6/1926 | Willis ......................... 294/50.8 |
| 1,765,651 A * | 6/1930 | Bryant ........................ 403/282 |
| 2,902,815 A | 9/1959 | Gallo, Sr. |
| 2,908,131 A | 10/1959 | Ross |
| 2,945,713 A * | 7/1960 | Sears ........................... 403/73 |
| 3,643,410 A | 2/1972 | Menning |
| 3,653,697 A * | 4/1972 | Ernst ........................... 403/243 |
| 3,688,484 A * | 9/1972 | Cox et al. .................. 56/400.12 |
| 3,833,250 A | 9/1974 | Lawrence |
| 4,037,397 A * | 7/1977 | Fiorentino ................ 56/400.12 |
| 4,068,346 A * | 1/1978 | Binder ........................ 16/110.1 |
| 4,162,132 A * | 7/1979 | Kress et al. ................. 403/361 |
| 4,174,003 A | 11/1979 | Zepeda |
| 4,292,794 A * | 10/1981 | Gascon ..................... 56/400.16 |
| 4,378,671 A * | 4/1983 | Gascon ..................... 56/400.12 |
| 4,514,970 A | 5/1985 | Wilson |
| 4,730,864 A | 3/1988 | Sample |
| 4,768,303 A * | 9/1988 | Baylink .................. 43/18.1 CT |
| 4,821,500 A | 4/1989 | MacIvergan |
| 4,866,922 A | 9/1989 | Clark |
| 5,114,199 A * | 5/1992 | Newcomer ................. 294/50.8 |
| 5,182,899 A | 2/1993 | Sun |
| 5,185,992 A * | 2/1993 | Garcia ..................... 56/400.04 |
| 5,343,684 A | 9/1994 | Siler, III |
| 5,452,570 A | 9/1995 | Schmid |
| 5,511,370 A | 4/1996 | Patel |
| 5,564,267 A * | 10/1996 | Bricker et al. ........... 56/400.12 |
| 5,601,322 A * | 2/1997 | Forest ........................... 294/3 |
| 5,706,640 A | 1/1998 | Tyrrell |
| 5,727,580 A * | 3/1998 | Patterson ................ 134/115 R |
| 5,791,053 A * | 8/1998 | Koong ........................ 30/142 |
| 5,816,633 A * | 10/1998 | Odom ......................... 294/51 |
| 5,901,540 A * | 5/1999 | Vella ....................... 56/400.12 |
| 5,915,482 A * | 6/1999 | Carruthers .................. 172/375 |
| 5,918,920 A | 7/1999 | Tamburro, Sr. |
| 6,120,073 A | 9/2000 | Jones |
| 6,151,878 A | 11/2000 | Kalavitis |
| 6,227,750 B1 * | 5/2001 | Maggio et al. ............... 403/79 |
| 6,311,465 B1 | 11/2001 | Stuart |
| 6,367,236 B1 | 4/2002 | Marcone |
| 6,502,381 B2 | 1/2003 | Crites |
| 2002/0129594 A1 | 9/2002 | Gulotti |
| 2003/0079460 A1 | 5/2003 | Kill |

* cited by examiner

*Primary Examiner*—Thomas B. Will
*Assistant Examiner*—Alicia Torres
(74) *Attorney, Agent, or Firm*—Hahn Loeser & Parks, LLP; W. Edward Crooks, Esq.

(57) ABSTRACT

A device for combining two rakes to provide a combination raking and picking up apparatus comprises a pair of sleeves pivotally attached to one another. A first rake handle is secured into the first of the connected sleeves. A third sleeve is separately attached to a second rake handle. The third sleeve and rake handle fit into the second sleeve. The attachment of the second sleeve to the third sleeve allows the second rake to rotate at least 180 degrees within the second sleeve. This allows a user to use the apparatus for raking lawn debris and to easily convert the apparatus to enable the user to pick up debris as well.

20 Claims, 6 Drawing Sheets

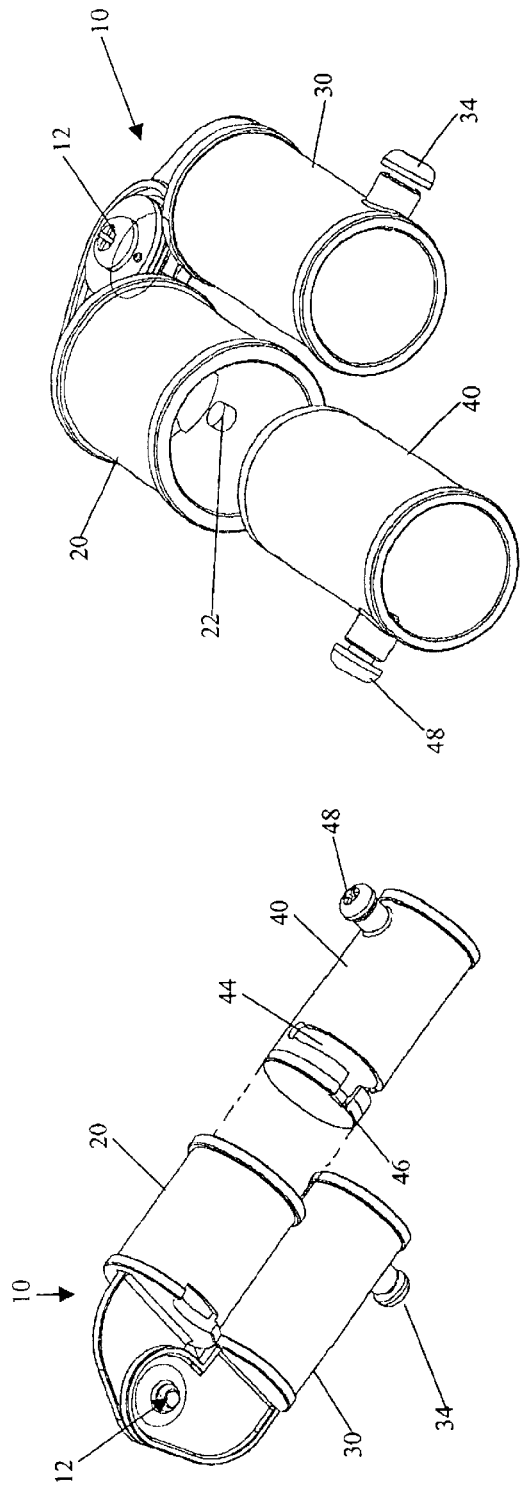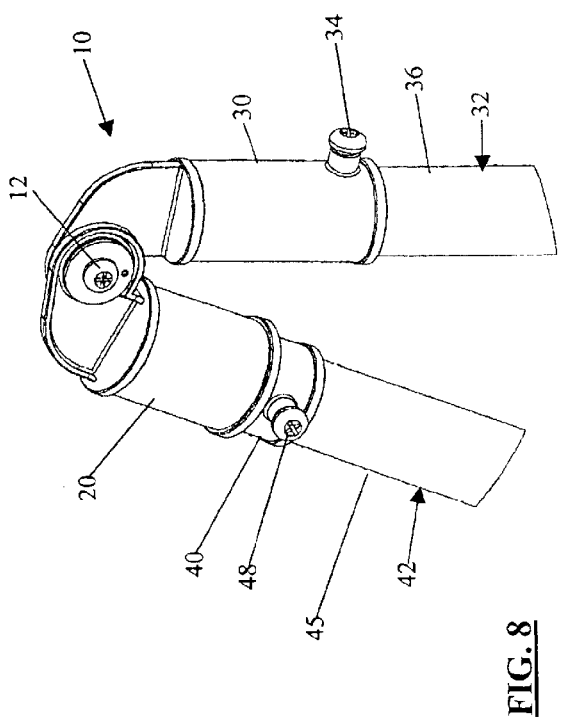
FIG. 2
FIG. 3
FIG. 8

US 6,904,743 B2

LEAF RAKE COMBO KIT

This application claims the benefit of U.S. Provisional Application No. 60/493,261, filed Aug. 7, 2003, which is hereby incorporated by reference.

TECHNICAL FIELD

The present invention relates generally to gardening and lawn-care rakes, more particularly it relates to a leaf rake and leaf pick-up combination apparatus or kit, specifically a device that can combine and utilize two otherwise independent existing rakes and convert them into a new and useful dual-purpose gardening (raking) and lawn-clearing (picking) tool to facilitate ready disposal of raked material.

BACKGROUND

The leaf rake is an ancient, relatively simple gardening tool of which there are many varieties with significant differences. Gardeners and landscapers who wish to maintain a well-groomed lawn will regularly cut the grass and will use these standard hand tools to gather loose grass cuttings or clippings, fallen leaves, and other unattached relatively light lawn or yard debris. Although there are alternate and modern solutions to leaf raking and subsequent removal, including leaf blowers, bag-equipped power lawn mowers, or even burning in place, these are usually either noisy, comparatively expensive, unsafe, or environmentally suspect and thus the traditional, though laborious, lawn-raking task is still in wide use.

A typical leaf rake has a straight, cylindrical, elongated, inflexible, either metallic, hard plastic or wooden handle, that is attached to a fan-type rake head usually consisting of a polypropylene or metallic plurality of teeth or tines that are inwardly curved at their edges. Although raking itself can be a difficult task due the upper body strength requirement, after the leaves are raked and gathered into piles, they still require pick up and removal. Conventional leaf rakes are well suited to raking leaves into piles, but they are generally not designed for lifting capabilities. Because of the necessary leverage for picking up and transporting the raked material, this task is usually the most difficult aspect of this largely seasonal activity and generally requires alternating use of separate pick up implements, such as a shovel and yard broom. If the proper tools are unavailable, leaf and debris pick up may involve bending over, kneeling, or stooping, then gathering and pressing the leaves or other raked material with one hand, against the rake head and tines held by the other hand.

Although those skilled in the prior art will be aware of multi-purpose rake combination devices and rake attachments, such as a rake and shovel combination, or an all-in-one pick-up rake that uses two oppositely directed rake heads for grabbing leaves and debris, and facilitating the leaf pick up task, these are generally of cumbersome design, sometimes requiring costly, complex and bulky additions to a conventional rake. In addition, these inventions generally do not fully employ both rake heads during the raking operation. Furthermore, such combination rakes and rake attachments are generally not intended to accommodate complete separation into independent rakes so that two individuals may rake simultaneously and complete the task within a shorter period.

Even though one conceivably can use a pair of unconnected independent rakes for raking and picking up grass, leaves and light debris, the rake combo kit's major advantage is its ability to combine these implements in a simple manner and into an efficient and steadfast tool that will accomplish both tasks while reducing the tedium of both raking and picking up. In addition, with the present invention both rakes are functional during raking—to achieve greater raking efficiency when the two rake heads are aligned with two rows of back-to-back teeth—and of course during leaf pick up.

It is therefore a primary objective of this invention to provide a two-rake attachment device that has advantages not taught by the prior art.

Another principal object of this invention is to supply a dual-purpose rake combo kit for attaching, in a preferred embodiment, two conventional leaf rakes to provide a convenient method for both leaf and debris gathering or raking and then trouble-free pick up of such material, and effortless alternating between these tasks, thereby eliminating the need for additional tools for these separate tasks.

SUMMARY

The rake combo kit is directed toward a simple rake attachment device for attaching two rakes around a common pivot point. In a preferred embodiment the apparatus comprises a first sleeve adapted to be secured to a first rake handle, a second sleeve pivotally connected to said first sleeve, and a third sleeve adapted to be secured to a second rake handle. The second sleeve is adapted to receive said third sleeve. The second and third sleeves also comprises means for permitting rotation of said third sleeve and said second rake handle within said second sleeve. The kit of the present invention may be constructed of metal, molded plastic or any other suitable materials and are assembled, fitted, and operated as described in more detail below.

BRIEF DESCRIPTION OF THE DRAWINGS

One can better understand the present invention when one refers to the accompanying drawings of preferred embodiments of the present invention:

FIG. 2 shows a perspective view with the free rake sleeve outside of the outer sleeve in accordance with a first embodiment of the present invention;

FIG. 3 shows another perspective view from below the sleeves so that the outer sleeve guide pin is visible in accordance with a first embodiment of the present invention;

FIG. 8 shows in perspective view the combo apparatus with partial view of attached fixed rake and free rake in their respective sleeves and in picking up position;

DETAILED DESCRIPTION OF THE INVENTION

Figure 1:
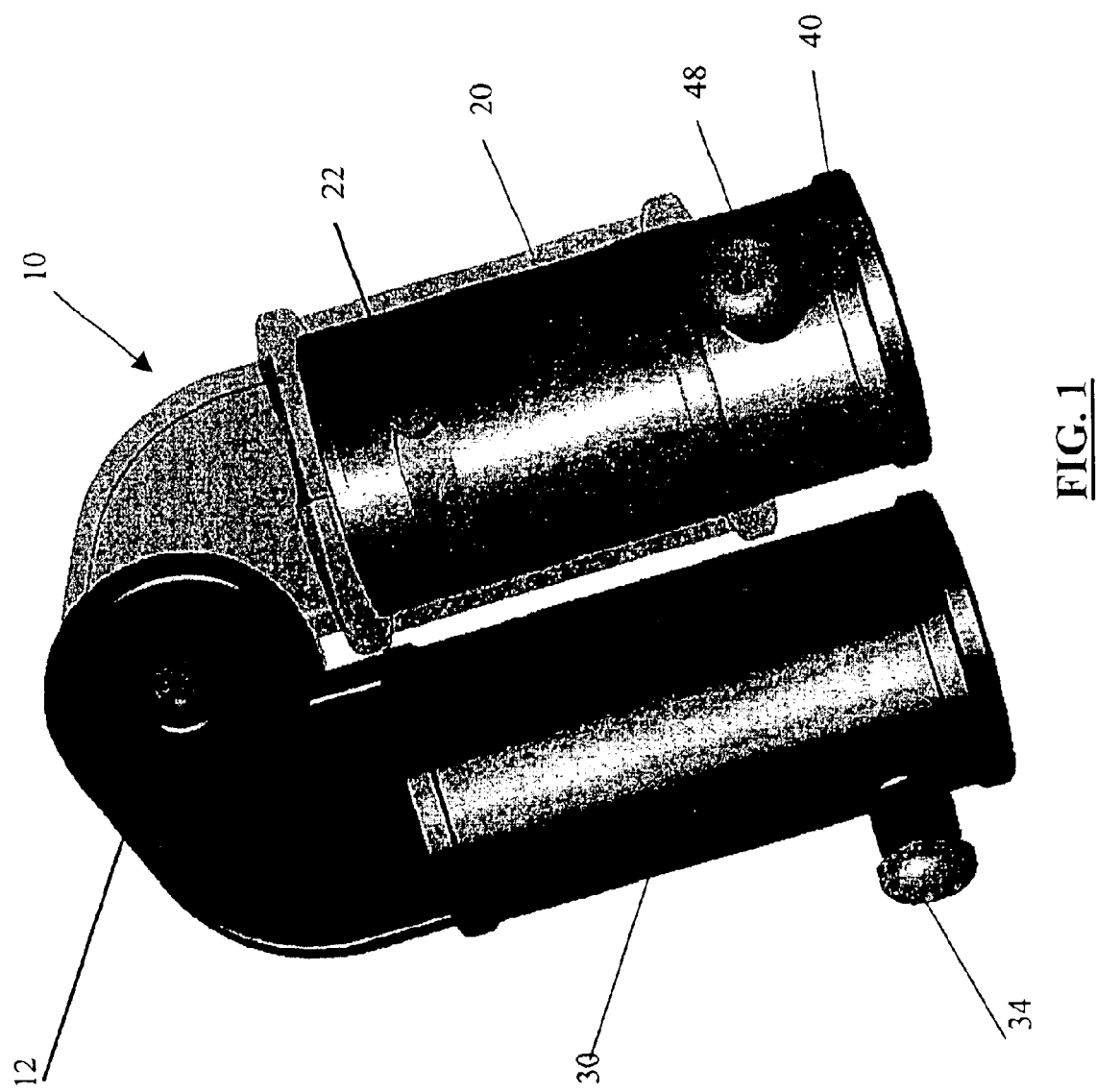
FIG. 1 shows in perspective view a first embodiment of the present invention with the outer sleeve shown transparently to illustrate the sleeve's internal guide pin.

The figures illustrate various embodiments of the present invention, which may be used to join two rakes and wherein identical parts are identified with identical reference numeral. In general, the present invention comprises a first (fixed) sleeve, which is adapted to receive a first rake, and a second (outer) sleeve, pivotally connected to the first sleeve. The invention also includes a third sleeve, also referred to as a free rake sleeve. The third sleeve is attached to a second rake. The second and third sleeves are adapted to be connected together, at least temporarily, so that the third sleeve and the second rake may be rotatably positioned within the second (outer) sleeve.

Figure 7:
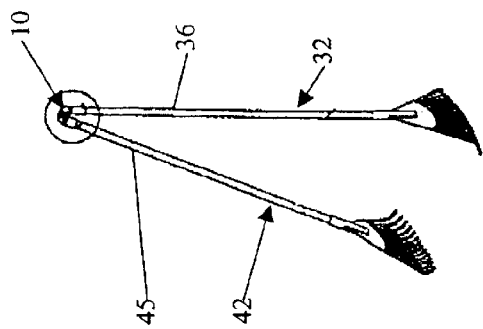
FIG. 7 depicts an overview of two rakes connected at their tops and in picking up position.
Figure 5:
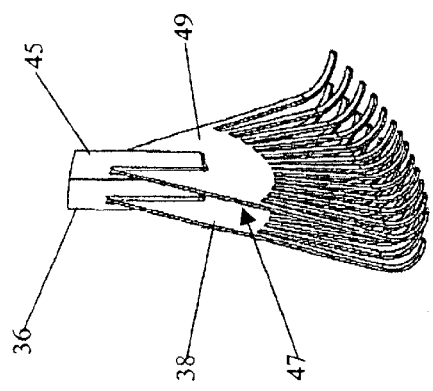
FIG. 5 depicts a front perspective view of two rake heads in raking position.
Figure 6:
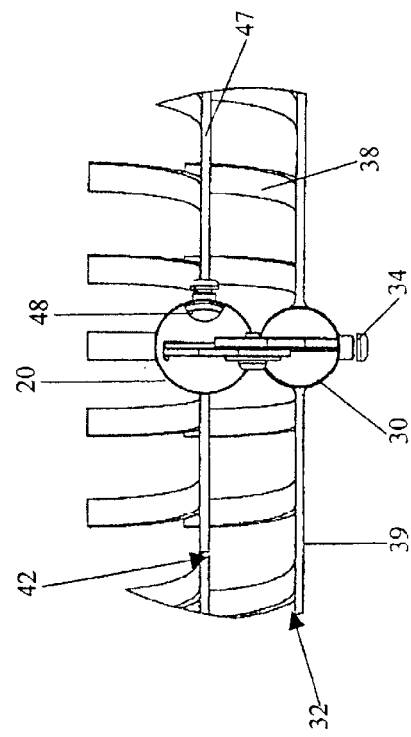
FIG. 6 shows a partial top detailed view of two rakes nested together in operative raking position.
Figure 4:
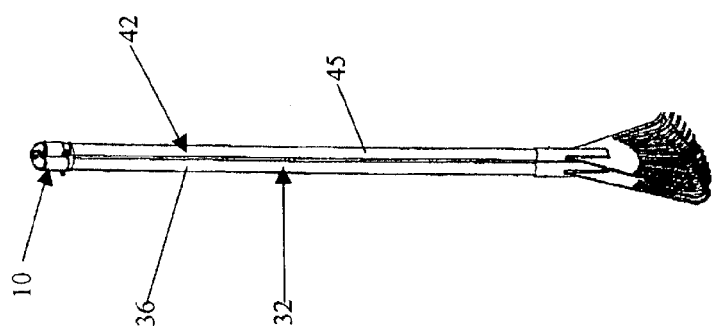
FIG. 4 depicts an overview of two rakes connected at their tops and in raking position.

FIGS. 1–3 illustrate a first embodiment of the rake combo kit 10 with cylindrical sleeves designed to accommodate the upper portion of the elongated rake handles of a pair of rakes. In a preferred embodiment, the rake combo kit 10 has the following main parts: an outer sleeve 20, a fixed rake sleeve 30, and a free rake sleeve 40. The outer sleeve 20 and fixed rake sleeve 30 are pivotally attached to facilitate rotation in a plane around a common pivot point 12 and allow moving apart the rakes 32 and 42 between a raking position and a picking up position, as shown in FIGS. 4 and 7. Turning now to FIGS. 2 and 3, the cylindrical free rake sleeve 40 contains a 180 degree wide groove 44 designed for inserting, via an assembly opening 46, a corresponding solid guide pin 22 situated on the inside of the outer sleeve 20. In one embodiment, the guide pin groove or channel 44 corresponds to a half circle path running at least halfway around the circumference of the free rake sleeve 40. In one embodiment, the guide pin groove path 44 may begin or end at a point apart from but vertically in line with a sleeve tightening screw 48. The assembly opening 46 may be situated at or near the center of the groove path 44 and sized to fit the guide pin 22 so that guide pin may move within assembly opening and groove path. In a preferred embodiment, the guide pin is located perpendicular to the location of at least one fixed rake sleeve tightening screw 34. In a preferred embodiment, a fixed rake sleeve tightening screw is located on the sleeve 30 at a point along its outermost circular edge. However, it is contemplated that the groove 44, assembly opening 46, guide pin 22 and tightening screws 34 and 48, may be placed at alternate locations such that their fitting together and operation will achieve substantially the same results.

Rakes connected together via an apparatus in accordance with the present invention are illustrated in FIGS. 4–8. To connect two rakes 32 and 42, one rake handle 36 is attached to a fixed rake sleeve 30 and one rake handle 45 is attached to a free rake sleeve 40. Free rake sleeve 40 is then inserted into the outer sleeve 20 of the rake combo kit 10. To attach the handle 36 of a first rake 32 to the fixed rake sleeve 30, the top of handle 36 is placed into fixed rake sleeve 30 with the outer sleeve 20 on the same side as the rake head face 38 (the side of the head directed toward the ground during raking). In a preferred embodiment, rake handle 36 is secured to fixed rake sleeve 30 by turning at least one fixed rake sleeve tightening screw 34 so that it contacts or penetrates the rake handle 36. It is also contemplated that secure attachment can be achieved by any other mechanical fastening means known in the art. The first rake now becomes the fixed rake 32. In a preferred embodiment, the fixed rake tightening screw 34 is perpendicular to the back rake edge 39 of the fixed rake 32 when the fixed rake handle 36 is within the fixed rake sleeve 30. However, it is contemplated that the fixed rake tightening screw 34 may be placed at alternate positions on the fixed rake sleeve 30. The fixed rake handle 36 should be secured to prevent rotation and vertical movement of the handle 36 within the fixed sleeve 30. A second rake, which in a preferred embodiment is similarly constructed to the first rake, is used as the free rake 42.

In one embodiment, a handle 45 of a second rake 42 is attached to the free rake sleeve 40 via inserting rake handle 45 into free sleeve 40. In a preferred embodiment, the free sleeve 40 is rotated until the free rake sleeve tightening screw 48 is parallel with an edge 47 of free rake 42. The free rake handle 45 is secured to free rake sleeve 40 by turning the free rake sleeve tightening screw 48 so that the screw contacts or penetrates rake handle 45. Other known mechanical fastening means may also be used to secure the free rake sleeve 40 to rake handle 45. The free rake handle 45 is secured to prevent rotation and vertical movement of the handle 45 within the free rake sleeve 40.

To assemble the combination kit 10, the free rake sleeve 40 is fitted into the outer sleeve 20. The free rake sleeve 40 fits inside the outer sleeve 20 by pushing the free rake sleeve 40 through the outer sleeve 20 until the guide pin 22 enters the assembly opening 46 of the free rake sleeve 40. The guide pin 22 works to retain the free rake sleeve 40 inside the outer sleeve 20 and guides the free rake sleeve 40 when it rotates between the raking and picking up positions. The free rake sleeve 40 is thus in operative position and may then be rotated through a 180 degree range, in either clockwise or counter-clockwise direction within the guide pin groove 44, to alternatively accommodate either raking or picking up. From FIGS. 2 and 3 one can visualize how the outer sleeve guide pin 22 works in conjunction with the assembly opening 46 and the guide pin groove 44 of the free rake sleeve 40.

To reorient the position of the free rake head 49 from a raking position to a picking up position the rake handles 36 and 45 are spread apart and the free rake sleeve 40 is rotated via its guide pin groove 44. In the raking position (See FIGS. 4, 5 and 6), curvature of rake tines of fixed 32 and free rake 42 will be in the same direction, and in the pick up position (See FIG. 7) rake heads 38 and 49 will face each other with the rake tine curvature of each rake oriented in opposite directions. Thus, depending on the initial positioning of the free rake 42 on the free rake sleeve 40, the rake combo kit 10 either allows raking at zero degrees and picking up at 180 degrees or vice versa. FIGS. 7 and 8 show the rake assembly in picking up position.

The free rake sleeve 40 may be constructed so that it can be disengaged from the rake combo kit 10 to separate the rakes 32 and 42 for independent raking activities. The rakes 32 and 42 may be swung apart as shown in FIG. 7. The free rake sleeve 40 may then be rotated midway between the guide pin channel or through a 90 degree angle from either the raking or picking up position, so that it may be pulled through the assembly opening 46 and out of the outer sleeve 20.

Another embodiment is shown in FIGS. 9–16. This embodiment still employs a fixed rake sleeve 50, an outer sleeve 52, and a free rake sleeve 54. This embodiment uses a latch 60 to secure the free rake sleeve 54 to outer sleeve 52. The latch comprises a base 61, a C-shaped portion 63 extending perpendicular from the base 61, and a guide pin 62, extending perpendicular from the base 61 and parallel to the C-shaped portion 63.

In this embodiment, the outer sleeve 52 has a latch-receiving portion 70. This latch-receiving portion 70 is substantially L-shaped and comprises a boss 72 for receiving a guide pin 62 and guide flanges 74. The boss 72 has an opening, which extends through into the interior of the outer sleeve 52. The free rake sleeve 54 includes a groove or channel 56 for receiving the guide pin 62 and a tightening screw 58. The guide flanges mate 74 mate with channels 65 in C-shaped portion 63 of latch 60, while the guide pin 62 is inserted into the boss 72. The latch receiving portion 70 further includes a hole 68 for receiving latch retaining screw 66. Latch 60 also includes a slot 64 for receiving the latch retaining screw. Latch retaining screw 66 is positioned within slot 64 and extends into hole 68. Slot 64 is shaped to allow it to be snapped into an out of a locked position around the retaining screw 66 when fully assembled. In a preferred embodiment, the latch has an open 8-like shape so that the latch has a detent feel when the latch is moved from a locked to an unlocked position and vice versa.

Figure 9:
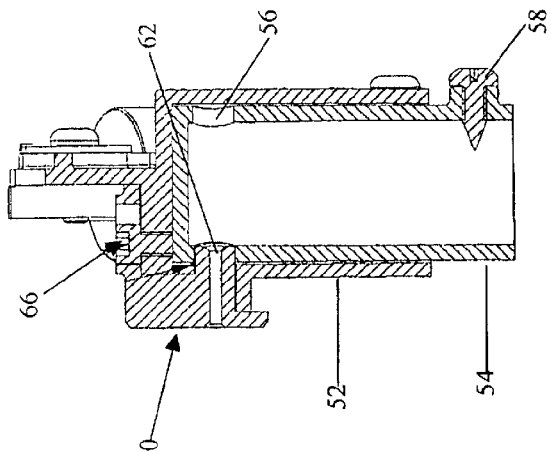
FIG. 9 shows a first perspective view of a second embodiment of the present invention, with the latch in a locked position.
Figure 11:
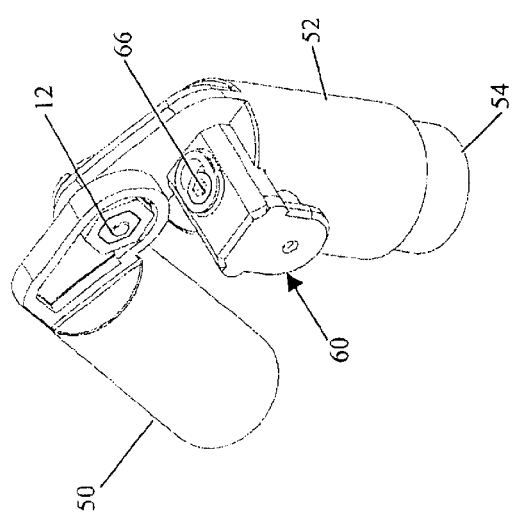
FIG. 11 shows a perspective view of a second embodiment of the present invention with the latch in an unlocked position.
Figure 10:
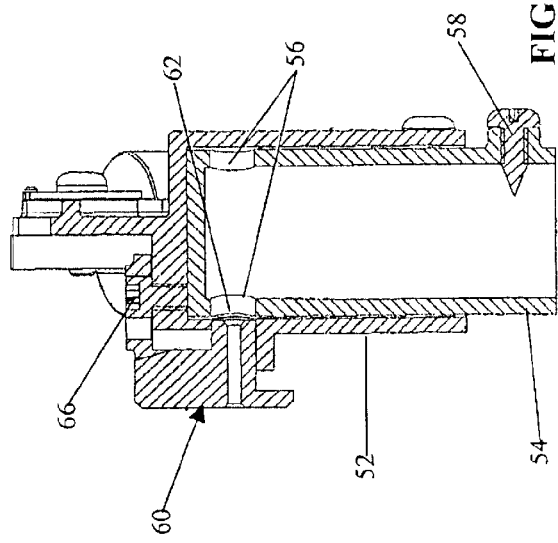
FIG. 10 shows a side cross sectional view of the embodiment shown in FIG. 9.
Figure 12:
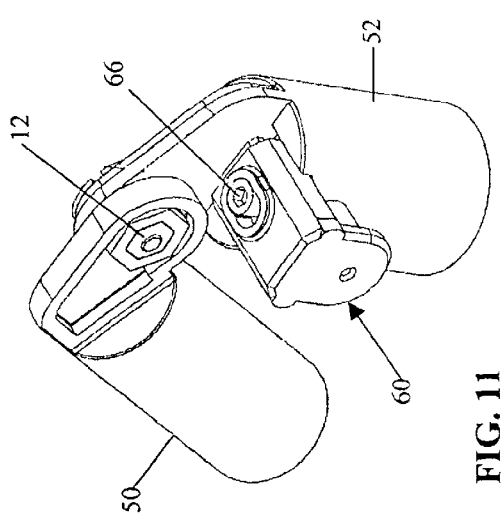
FIG. 12 shows a side cross sectional view of the embodiment shown in FIG. 11.
Figure 14:
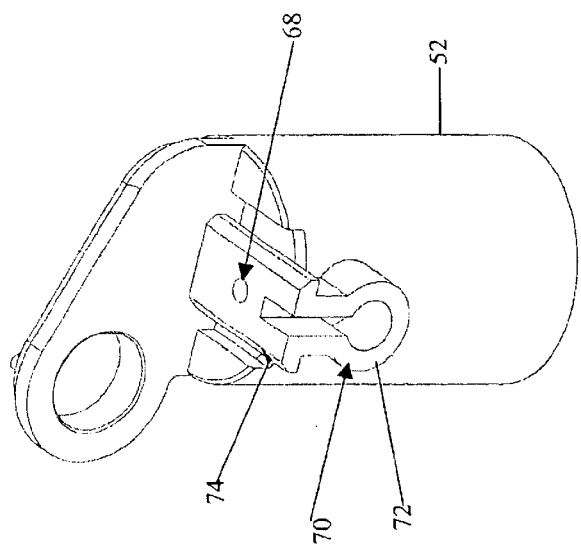
FIG. 14 shows a perspective view of an outer sleeve in accordance with a second embodiment of the present invention.
Figure 16:
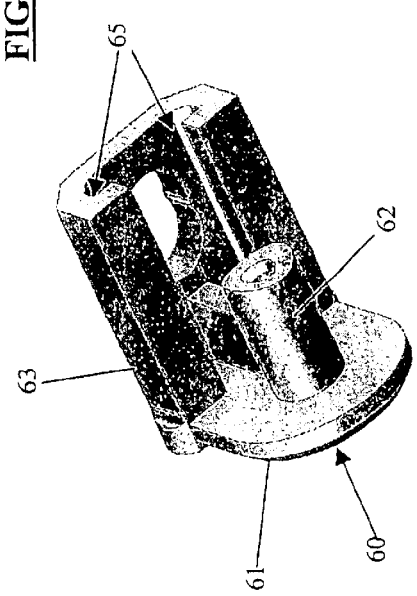
FIG. 16 shows a perspective view of a latch in accordance with a second embodiment of the present invention.
Figure 13:
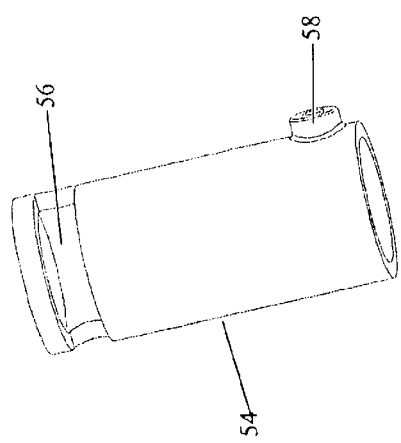
FIG. 13 shows a perspective view of a free rake sleeve in accordance with a second embodiment of the present invention.
Figure 15:
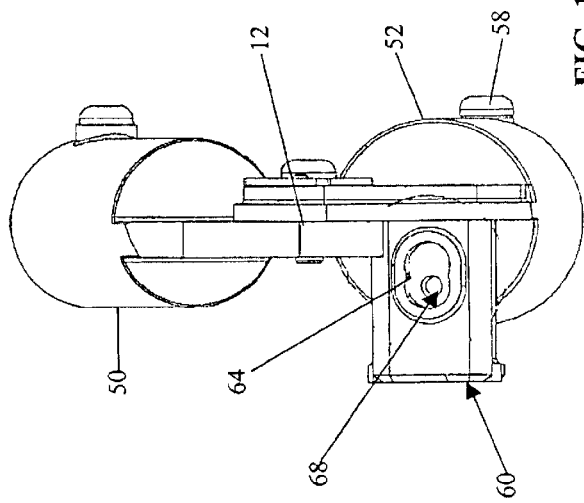
FIG. 15 shows a top view of a kit in accordance with a second embodiment of the present invention.

In use, the fixed rake sleeve is attached to the fixed rake as described herein. The free rake sleeve is positioned on the handle of a second rake and is secured via at least one tightening screw 58. In a preferred embodiment, one or more tightening screws 58 may be located at a lower portion of the free rake sleeve so that they do not interfere with the positioning and/or rotation of the free rake sleeve 54 in the outer sleeve 52. For ease of use, the latch 60 is preferably secured to the outer sleeve 54 before inserting the free rake sleeve 54 and rake into the outer sleeve 54. The latch 60 is slid over the lower latch component so that the channels 65 slidably engage flanges 74 and the guide pin 62 enters guide pin boss 72. The latch retaining screw is then inserted into hole 68 and tightened. With the latch in the open position (FIGS. 11 and 12), the free rake sleeve 54 and the free rake may be inserted into outer sleeve and rotated so that slot 56 is oriented towards guide pin 62. The latch is then pushed towards free rake into the locked position (FIGS. 9 and 10). In the locked position, the guide pin 62 is positioned within the guide pin groove 56 so that free rake sleeve 54 cannot fall out of outer sleeve 52. In this orientation, the free rake may be rotated at least 180 degrees between the raking and picking up positions. When the latch 60 is moved into the unlocked position, the guide pin 62 is withdrawn from the groove 56. In this position, the free rake sleeve may be constructed so that it can be removed from the outer sleeve 52 for separate use.

Figure 18:
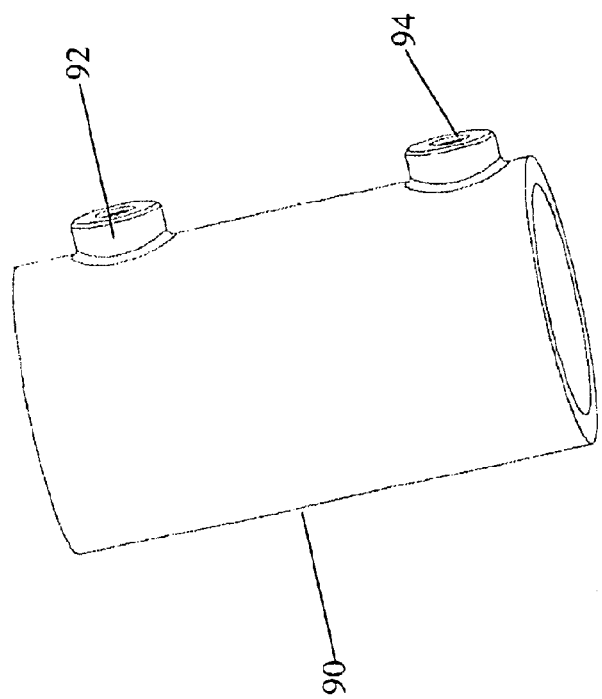
FIG. 18 shows a perspective view of a free sleeve in accordance with a third embodiment of the present invention.
Figure 17:
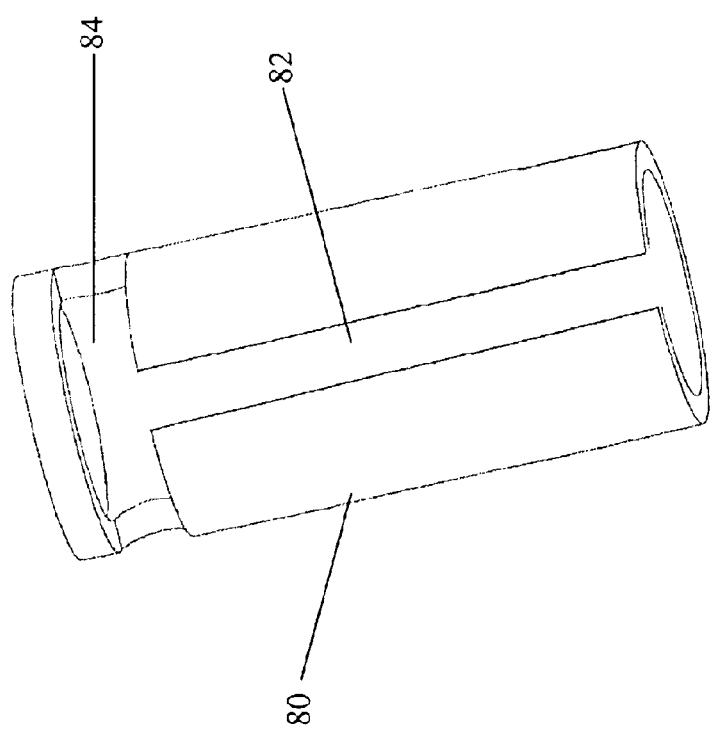
FIG. 17 shows a perspective view of a outer sleeve in accordance with a third embodiment of the present invention.

In a third embodiment shown in FIGS. 17 and 18, the outer sleeve 80 includes a semi-circular channel 84 at least a short distance inward from an upper edge of the outer sleeve 80. The outer sleeve also includes a horizontal channel perpendicular to the semi-circular channel 84 and extending downwardly to a lower edge of the outer sleeve.

The channels 82 and 84 are adapted to receive a guide pin 92 located on the free rake sleeve 90. Positioning the guide pin in the semi-circular channel 84 allows rotation of the free rake at least 180 degrees from a raking position to a picking up position. In this embodiment, the guide pin 92 may also be a tightening screw. If the guide pin 92 is not also a tightening screw, the free rake sleeve must be mechanically secured to the free rake handle by some other known mechanical means. Whether or not guide pin 92 is also a tightening screw, additional tightening screws 94 may be optionally positioned on the free rake sleeve 90 so long as the additional tightening screws do not interfere with the rotation of the free rake sleeve within the outer sleeve 90. It is also contemplated that the outer sleeve may have a plurality of semi-circular slots to correspond to a plurality of guide pins and/or tightening screws on the free rake sleeve.

In use, in this third embodiment, the fixed sleeve is secured to a first rake as described herein. The free rake sleeve is attached to a second rake, such that the guide pin is preferably aligned with a side edge of the second rake. The guide pin/retaining screw 92 is inserted into channel 82 on the outer sleeve and slid upwardly until guide pin 92 is within the semi-circular path 84. Now the second rake may be rotated within the outer sleeve between the raking and picking up positions. As an alternative to this embodiment, a guide pin may simply be attached to the free rake itself. In this embodiment, the free rake may be inserted into the outer sleeve and may be rotated within the outer sleeve. In another alternative embodiment, channel 82 may be eliminated. Free rake handle and/or free rake sleeve may be placed into the outer sleeve and then a tightening screw may be positioned within channel 84 to secure rake and/or sleeve within the outer handle and to allow rotation of rake.

To illustrate the invention, it is shown and described with respect to a preferred embodiment. This is not intended as a limitation, and other modifications or variations in the specific form shown and described will be apparent to those skilled in the art and will fall within the spirit of the invention and the scope of the following claims.

What is claimed is:

1. A device for combining a pair of rakes, each rake having a handle connected to a rake head with tines, said device comprising:
    a first sleeve adapted to be secured to a first rake handle;
    a second sleeve pivotally connected to said first sleeve; and
    a third sleeve adapted to be secured to a second rake handle; wherein,
    said second sleeve is adapted to receive said third sleeve,
    said third sleeve includes a semi-circular channel for receiving a guide pin extending from said second sleeve and allowing said third sleeve to rotate at least 180 degrees within said second sleeve and wherein,
    said third sleeve includes an opening extending between said semi-circular channel and an edge of said sleeve for receiving said guide pin as said third sleeve is positioned within said second sleeve.

2. The device as recited in claim 1, wherein said second sleeve includes a guide pin mounted on an inside surface thereof, the guide pin adapted to be engageable with a channel in said third sleeve.

3. The device as recited in claim 1 wherein said first sleeve comprises at least one tightening screw for securing said first sleeve to a handle of a rake.

4. The device as recited in claim 1 wherein said third sleeve comprises at least one tightening screw for securing said third sleeve to a handle of a rake.

5. A device for combining a pair of rakes, each rake having a handle connected to a rake head with tines, said device comprising:
- a first sleeve adapted to be secured to a first rake handle;
- a second sleeve pivotally connected to said first sleeve; and
- a third sleeve adapted to be secured to a second rake handle;
- wherein said second sleeve is adapted to receive said third sleeve and wherein said second sleeve includes a guide pin extending from said second sleeve and said third sleeve includes a semi-circular channel for receiving said guide pin and allowing said third sleeve to rotate at least 180 degrees within said second sleeve, and wherein the device further comprises:
- a latch, said latch comprising:
  - a base;
  - a guide pin extending perpendicular to said base surface; and
  - means for securing said latch to said second sleeve.

6. The device as recited in claim 5, wherein said second sleeve includes a boss and an opening therethrough for receiving said guide pin.

7. The device as recited in claim 6, wherein said latch may be positioned on said second sleeve such that said latch is secured to said second sleeve and said guide pin is inserted into said boss, through said opening, and into said channel when said third sleeve is inserted into said second sleeve.

8. The device as recited in claim 5, wherein said means for securing said-latch to said second sleeve comprises a C-shaped portion perpendicular to said base.

9. The device as recited in claim 8 wherein said second sleeve comprises flanges for engaging said C-shaped portion to secure said latch to said second sleeve.

10. The device as recited in claim 9, wherein said C-shaped portion comprises a slot in an upper portion thereof for receiving a latch retaining screw.

11. The device as recited in claim 10, wherein said second sleeve comprises a hole for receiving said retaining screw.

12. The device as recited in claim 11, wherein said latch may be positioned on said second sleeve such that said C-shaped portion slidably engages said flanges and said guide pin is inserted into said boss.

13. The device as recited in claim 12, further comprising a latch retaining screw positioned in said slot on said C-shaped portion and said hole for receiving said latch retaining screw on said second sleeve.

14. The device as recited in claim 13, wherein said latch may be moved from an unlocked to a locked position by sliding said latch in a direction towards said second sleeve so that said guide pin is inserted into said groove on said third sleeve.

15. A device for combining a pair of rakes, each rake having a handle connected to a rake head with tines, said device comprising:
- a first sleeve adapted to be secured to a first rake handle;
- a second sleeve pivotally connected to said first sleeve; and
- a third sleeve adapted to be secured to a second rake handle;
- wherein said second sleeve is adapted to receive said third sleeve, said third sleeve comprises a guide pin on an outer surface thereof and second sleeve comprises a T-shaped channel for receiving said guide pin for allowing said third sleeve to rotate at least 180 degrees within said second sleeve, and wherein said first sleeve includes a tightening screw for securing said first sleeve to a rake handle, and said third sleeve includes a tightening screw for securing said third sleeve to a rake handle.

16. An apparatus for connecting a pair of rakes, said apparatus comprising:
- a first cylindrical sleeve adapted to be secured to a first rake handle;
- a second cylindrical sleeve pivotally connected to said first sleeve, said second sleeve having a guide pin on an inner surface thereof; and
- a third cylindrical sleeve adapted to be secured to a second rake handle;
- wherein said second sleeve is adapted to receive said third sleeve and wherein said third sleeve has a T-shaped channel adapted for receiving said guide pin and allowing said third sleeve to rotate at least 180 degrees within said second sleeve.

17. An apparatus for connecting a pair of rakes, said apparatus comprising:
- a first cylindrical sleeve adapted to be secured to a first rake handle;
- a second cylindrical sleeve pivotally connected to said first sleeve, said second sleeve having a T-shaped channel therein; and
- a third cylindrical sleeve adapted to be secured to a second rake handle, said third sleeve having at least one guide pin on an outer surface thereof;
- wherein said second sleeve is adapted to receive said third sleeve and said T-shaped channel is adapted to receive said guide pin to allow said third sleeve to rotate at least 180 degrees within said second sleeve.

18. The device as recited in claim 17 wherein said first sleeve comprises at least one tightening screw for securing said first sleeve to a handle of a rake.

19. The device as recited in claim 17 wherein said third sleeve comprises at least one tightening screw for securing said third sleeve to a handle of a rake.

20. An apparatus for connecting a pair of rakes, said apparatus comprising:
- a first cylindrical sleeve adapted to be secured to a first rake handle;
- a second cylindrical sleeve pivotally connected to said first sleeve, said second sleeve comprising a substantially L-shaped latch receiving portion comprising a pair of flanges, a boss for receiving a guide pin, an opening extending through said boss into an interior of said second sleeve, and a hole for receiving a latch retaining screw;
- a third cylindrical sleeve adapted to receive a second rake handle, said third sleeve having a semi-circular channel therein;
- a latch, comprising a base, a guide pin extending perpendicular to said base, and a C-shaped portion extending perpendicular to said base and adapted to engage said pair of flanges, wherein said C-shaped portion has a slot in an upper portion thereof for receiving said latch retaining screw.

* * * * *

UNITED STATES PATENT AND TRADEMARK OFFICE
CERTIFICATE OF CORRECTION

PATENT NO.   : 6,904,743 B2
DATED        : June 14, 2005
INVENTOR(S)  : Hien Vodinh It is certified that error appears in the above-identified patent and that said Letters Patent is hereby corrected as shown below:

<u>Title page,</u>
Item [76], Inventor, please correct the inventor's name to read -- Hien Vodinh --.

Signed and Sealed this

Thirteenth Day of September, 2005

JON W. DUDAS
*Director of the United States Patent and Trademark Office*